(12) United States Patent
Sueoka et al.

(10) Patent No.: US 11,100,952 B2
(45) Date of Patent: Aug. 24, 2021

(54) STORAGE APPARATUS

(71) Applicant: SHOWA DENKO K.K., Tokyo (JP)

(72) Inventors: Yoshihito Sueoka, Chiba (JP); Masato Fukushima, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 17/095,934

(22) Filed: Nov. 12, 2020

(65) Prior Publication Data
US 2021/0166729 A1 Jun. 3, 2021

(30) Foreign Application Priority Data
Nov. 28, 2019 (JP) .............................. JP2019-215437

(51) Int. Cl.
G11B 5/54 (2006.01)
G11B 21/12 (2006.01)
G11B 21/08 (2006.01)
G11B 5/012 (2006.01)

(52) U.S. Cl.
CPC .............. *G11B 21/08* (2013.01); *G11B 5/012* (2013.01)

(58) Field of Classification Search
CPC ........... G11B 5/54; G11B 27/36; G11B 21/22; G11B 21/12
USPC .......................... 360/75, 254.3, 254.4, 255.1
See application file for complete search history.

(56) References Cited

U.S. PATENT DOCUMENTS

| | | | | |
|---|---|---|---|---|
| 5,764,437 A * | 6/1998 | Meyer | ...................... | G11B 5/54 360/254.3 |
| 6,115,214 A * | 9/2000 | Allsup | .................... | G11B 21/22 360/128 |
| 6,344,950 B1 * | 2/2002 | Watson | ..................... | G11B 5/54 360/254.3 |
| 6,480,361 B1 * | 11/2002 | Patterson | ................. | G11B 5/54 360/254.3 |
| 6,515,959 B1 * | 2/2003 | Fairchild | .................. | G11B 5/54 360/254.3 |
| 6,549,377 B2 * | 4/2003 | Yoshida | .................... | G11B 5/54 360/254.3 |
| 6,952,319 B2 * | 10/2005 | Weiehelt | ............ | G11B 5/59633 360/75 |
| 6,958,891 B2 * | 10/2005 | Bae | .......................... | G11B 5/54 360/254.3 |
| 7,672,083 B1 * | 3/2010 | Yu | ............................ | G11B 5/54 360/254.4 |

(Continued)

FOREIGN PATENT DOCUMENTS

JP     2000-222838     8/2000

*Primary Examiner* — Nabil Z Hindi
(74) *Attorney, Agent, or Firm* — IPUSA, PLLC

(57) ABSTRACT

A storage apparatus includes a disk-shaped recording medium having a surface, a motor configured to drive and rotate the recording medium, a head configured to read information from and write information to the recording medium, a ramp mechanism configured to move the head from a position above the surface of the recording medium to a head receded position, and a ramp retracting mechanism configured to move the ramp mechanism from a position above the surface of the recording medium to a ramp retracted position. Each of the head receded position and the ramp retracted position is outside a range of the recording medium in a plan view viewed from above the recording medium in a direction perpendicular to the surface of the recording medium.

7 Claims, 3 Drawing Sheets

(56) References Cited

U.S. PATENT DOCUMENTS 7,697,238 B2 * 4/2010 Makoto .................... G11B 5/54
                                                    360/254.3

* cited by examiner

STORAGE APPARATUS

CROSS-REFERENCE TO RELATED APPLICATIONS

This application is based upon and claims priority to Japanese Patent Application No. 2019-215437 filed on Nov. 28, 2019, the entire contents of which are incorporated herein by reference.

BACKGROUND OF THE INVENTION

1. Field of the Invention

The present invention relates to a storage apparatus. The storage apparatus is sometimes also referred to as a recording and reproducing apparatus.

2. Description of the Related Art

Recently, storage apparatuses, such as Hard Disk Drives (HDDs), are popularly used as external storage devices for computers. In recent years, such storage apparatuses are implemented in various mobile or portable products, including lap-top computers, pad devices, smartphones, or the like. For this reason, the storage apparatuses are also used in environments in which the storage apparatuses may be subject to external vibration and shock.

As a countermeasure against the vibration and shock applied to the HDD, a load and unload mechanism (or a ramp load mechanism) may be provided to move a head on a disk surface of a disk-shaped recording medium to a receded (or parked) position while the HDD is stopped.

According to such a ramp load mechanism, the head is unloaded to a ramp arranged outside a range of the disk-shaped recording medium in a plan view when the HDD is stopped, and the head is loaded from the ramp onto the disk-shaped recording medium when the HDD is started. The ramp is a sloped component, and the head positioned on the disk surface rides on this ramp when moving to the receded position, as described in Japanese Laid-Open Patent Publication No. 2000-222838, for example.

However, the recent developments of networks including the Internet and the expansion of the use of big data, require the storage capacity per unit volume of the HDD to increase. For this reason, in order to increase the storage capacity per standardized HDD, there are attempts to increase the number of disk-shaped recording media accommodated within a casing of the HDD.

For example, the thickness of a substrate of a conventional 3.5-inch disk-shaped recording medium is 1.27 mm, and in this case, a maximum of five disk-shaped recording media can be accommodated within the casing of the 3.5-inch standardized HDD. On the other hand, in recent high-capacity 3.5-inch standardized HDDs, more than five disk-shaped recording media are accommodated within the casing by reducing the thickness of the substrate.

The reduced thickness of the substrate of the disk-shaped recording medium deteriorates the rigidity of the substrate of the disk-shaped recording medium, and consequently, the disk-shaped recording medium may easily bend when a strong external vibration or shock is applied to the HDD. As a result, there is an increased risk of the disk-shaped recording medium inside the casing of the HDD making contact with other parts of the HDD, particularly when the strong external vibration or shock is applied to the HDD.

SUMMARY OF THE INVENTION

One object of the embodiments of the present invention is to provide a storage apparatus having a high resistance with respect to strong external vibration or shock that may be applied thereto.

A more specific object of the embodiments of the present invention is to provide a storage apparatus including a disk-shaped recording medium having a surface; a motor configured to drive and rotate the recording medium; a head configured to read information from and write information to the recording medium; a ramp mechanism configured to move the head from a position above the surface of the recording medium to a head receded position; and a ramp retracting mechanism configured to move the ramp mechanism from a position above the surface of the recording medium to a ramp retracted position, wherein each of the head receded position and the ramp retracted position is outside a range of the recording medium in a plan view viewed from above the recording medium in a direction perpendicular to the surface of the recording medium.

The ramp mechanism may move the head to the head receded position in response to a detection signal indicating that a vibration or shock applied to the storage apparatus is detected, or a cutoff of a power supply to the storage apparatus is detected.

The ramp retracting mechanism may move the ramp mechanism, carrying the head receded to the head receded position thereof, to the ramp retracted position in response to a detection signal indicating that a vibration or shock applied to the storage apparatus is detected, or a cutoff of a power supply to the storage apparatus is detected.

The ramp mechanism may be driven by a counter electromotive force generated by an inertial rotation of the motor when a power supply to the storage apparatus is cut off.

The ramp retracting mechanism may be driven by a counter electromotive force generated by the inertial rotation of the motor when the power supply to the storage apparatus is cut off.

Other objects and further features of the present invention will be apparent from the following detailed description when read in conjunction with the accompanying drawings.

DESCRIPTION OF THE PREFERRED EMBODIMENTS

Figure 1:
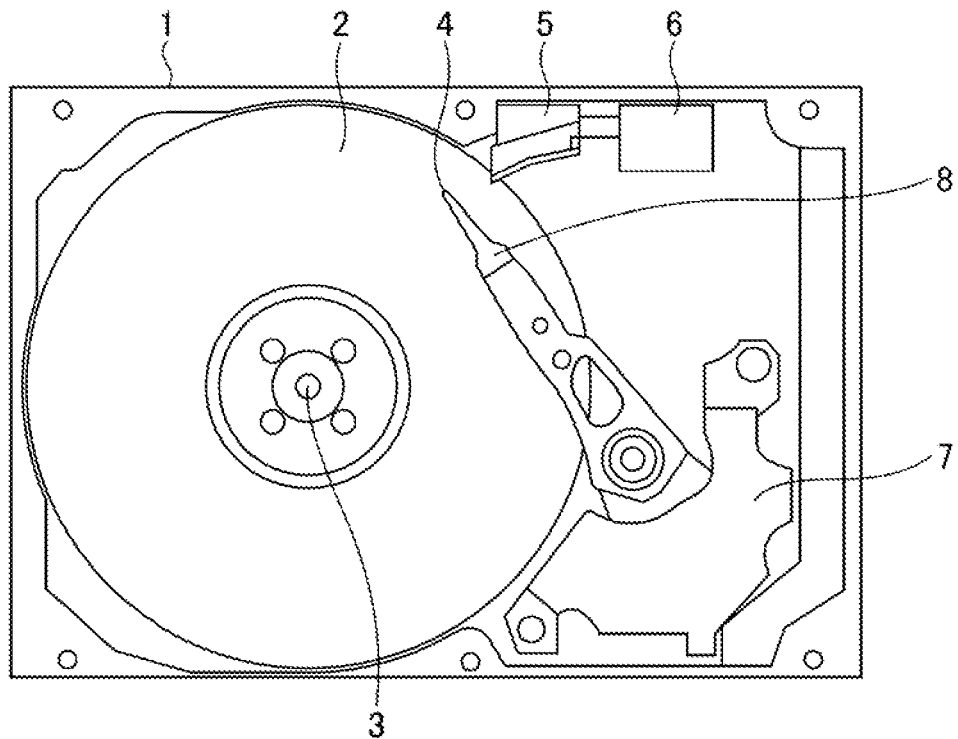
FIG. 1 is a schematic plan view for explaining a storage apparatus according to a first embodiment of the present invention.

Embodiments of the present invention will be described with reference to the drawings. The same constituent elements are designated by the same reference numerals, and a repeated description of the same constituent elements will be omitted.

The present disclosure relates to a storage apparatus including a head, and a ramp mechanism for causing the head to recede from a position above a recording medium (or platter). FIG. 1 is a schematic plan view for explaining the storage apparatus according to a first embodiment of the present invention.

In FIG. 1, a storage apparatus (recording and reproducing apparatus, or write and read apparatus) 1 according to this embodiment includes a disk-shaped recording medium (hereinafter also simply referred to as a "recording medium") 2, a motor 3 configured to drive and rotate the recording medium 2, a head 4 configured to read information from and write information to the recording medium 2, a ramp mechanism 5 configured move the head 4 from a position above the recording medium 2 to a head receded (or parked) position, and a ramp retracting mechanism 6 configured to move the ramp mechanism 5 from a position above the recording medium 2 to a ramp retracted position. The ramp mechanism 5 may employ a conventional configuration to move the head 4 from the position above the recording medium 2 to the head receded position.

FIG. 1 illustrates the storage apparatus 1 in a state where the head 4 is used to read information from or write information to the recording medium 2. In this state, the head 4 floats vertically over a surface (or recording surface) of the recording medium 2 due to a vortex of air created by the rotation of the recording medium 2 by the motor 3. In addition, the head 4 is driven by a voice coil motor 7 to move in a direction parallel to the surface of the recording medium 2.

Figure 2:
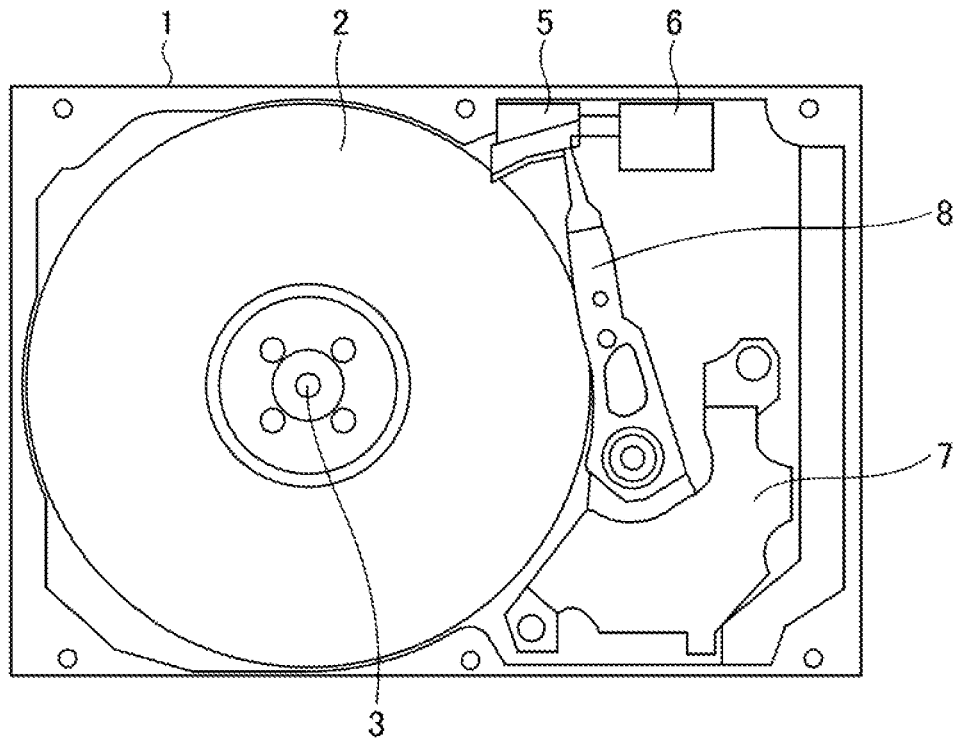
FIG. 2 is a schematic plan view for explaining the storage apparatus in the first embodiment of the present invention.
Figure 3:
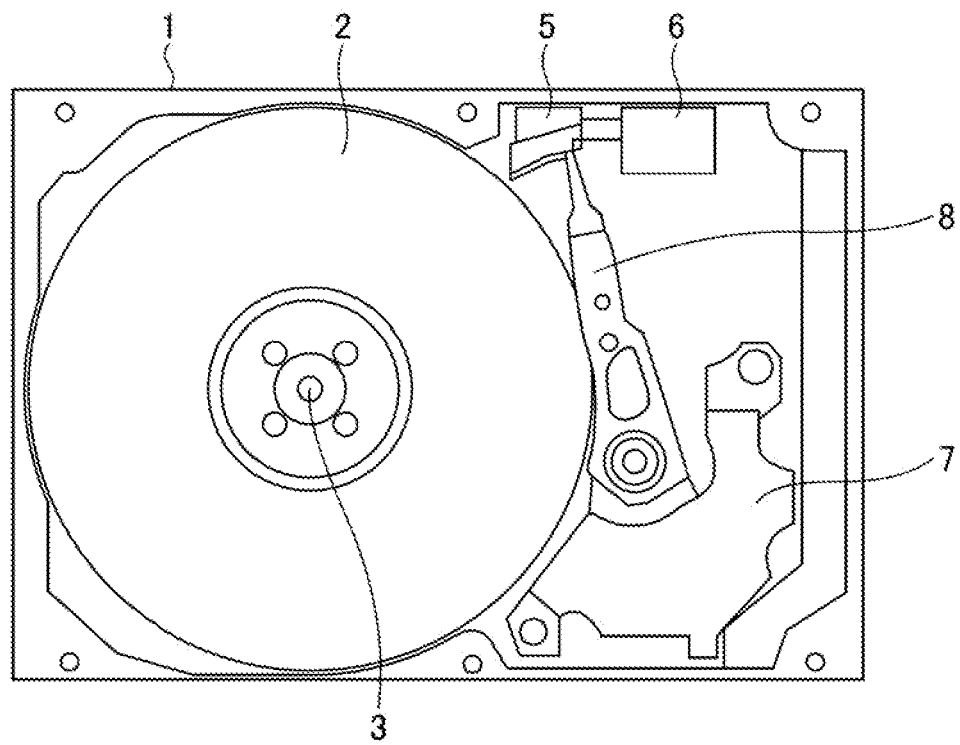
FIG. 3 is a schematic plan view for explaining the storage apparatus in the first embodiment of the present invention.

FIG. 2 and FIG. 3 illustrate procedures for stopping the reading or writing of information by the storage apparatus 1. First, as illustrated in FIG. 2, the head 4 is moved from the position above the recording medium 2 to the head receded position. The head 4 in the head receded position is not located above the surface of the recording medium 2, and is located outside a range (or outside a surface area) of the recording medium 2 in the plan view. Then, as illustrated in FIG. 3, the ramp mechanism 5 is moved from a position above the recording medium 2 to the ramp retracted position, by the ramp retracting mechanism 6. The ramp mechanism 5 in the ramp retracted position is not located above the surface of the recording medium 2, and is located outside the range of the recording medium 2 in the plan view.

In the plan view of FIG. 2, viewed from above the recording medium 2 in a direction perpendicular to the surface of the recording medium 2, a portion of the ramp mechanism 5 overlaps the recording medium 2. But in a side view (not illustrated) of the storage apparatus 1, a gap between the ramp mechanism 5 and the surface of the recording medium is approximately 1 mm or less but greater than 0 (zero). The head 4 is driven by the voice coil motor 7, and a portion often referred to as a tab, mounted on a tip end of the head 4, rides on a ramp provided on the ramp mechanism 5 when receding to the head receded position outside the range of the recording medium 2 in the plan view. In order to enable the head 4 to smoothly recede to the head receded position, the ramp mechanism 5 needs to be arranged at a position overlapping the recording medium 2 in the plan view, while minimizing the gap between the ramp mechanism 5 and the surface of the recording medium 2. For this reason, when a strong external vibration or shock is applied to the storage apparatus 1 that is in the stopped state, the recording medium 2 may bend and make contact with a portion of the ramp mechanism 5.

Accordingly, in this embodiment, the ramp mechanism 5 in the state where the head 4 is receded to the head receded position, is moved from the position above the recording medium 2 to the ramp retracted position outside the range of the recording medium 2 in the plan view, by the ramp retracting mechanism 6, as illustrated in FIG. 3. Accordingly, in the storage apparatus 1 according to this embodiment, it is possible to avoid contact between the ramp mechanism 5 and the recording medium 2, and achieve a high reliability of the storage apparatus 1, even when the recording medium bends due to the strong external vibration or shock applied to the storage apparatus 1 that is in the stopped state where the information read or the information write of the storage apparatus 1 is stopped. A conventional driving mechanism (or driving means) may be used for the ramp retracting mechanism 6. For example, a driving mechanism using a magnet, a motor, a ball screw, or the like, may be used for the ramp retracting mechanism 6.

Furthermore, the ramp retracting mechanism 6 according to this embodiment may also include a mechanism configured to move the ramp mechanism 5 to the ramp retracted position using a frictional force, an inertial force, or the like that is generated when the head 4 or the voice coil motor 7 performs an operation to move the head 4 to the head receded position.

Figure 4:
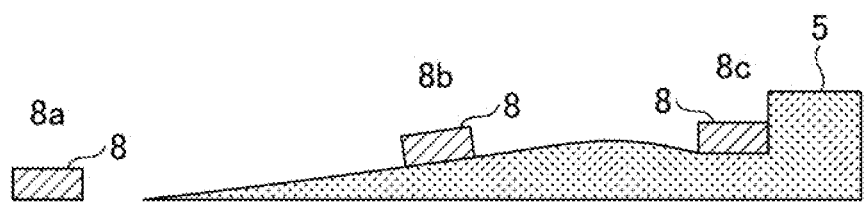
FIG. 4 is a schematic side view for explaining the storage apparatus according to a second embodiment of the present invention.

FIG. 4 is a schematic side view for explaining the storage apparatus according to a second embodiment of the present invention. As illustrated in FIG. 4, this embodiment employs the method of moving the ramp mechanism 5 from the position above the recording medium 2 to the ramp retracted position, using the frictional force applied from a suspension arm 8 to the ramp mechanism 5 when the suspension arm 8 moves from a first position 8a to a second position 8b by riding on the ramp mechanism 5, or using the inertial force at a third position 8c where the suspension arm 8 hits an end portion of the ramp mechanism 5.

Figure 5:
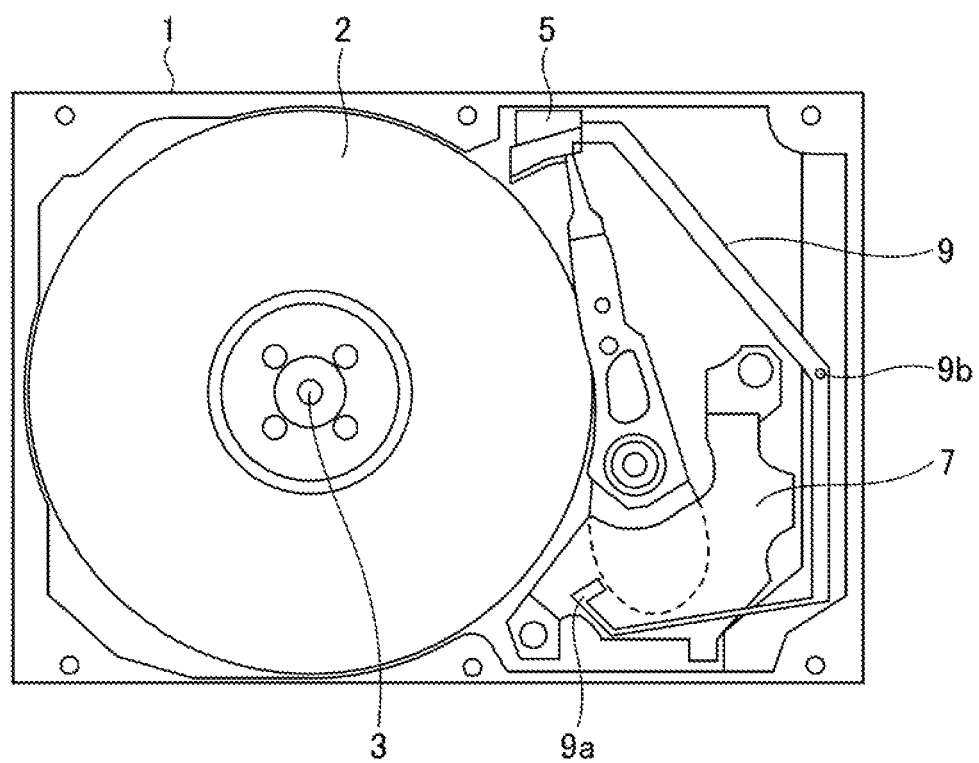
FIG. 5 is a schematic plan view for explaining the storage apparatus according to a third embodiment of the present invention.

FIG. 5 is a schematic plan view for explaining the storage apparatus according to a third embodiment of the present invention. As illustrated in FIG. 5, this embodiment employs the method of moving the ramp mechanism 5 from the position above the recording medium 2 to the ramp retracted position, using the inertial force of the voice coil motor 7 (the inertial force of a portion indicated by a dotted line in FIG. 5), and applying this inertial force to the ramp mechanism 5 via a lever 9. In FIG. 5, the lever 9 has a point of action designated by a reference numeral 9a, and a fulcrum designated by a reference numeral 9b. The ramp mechanism 5 moves to the right in FIG. 5 as the position of the point of action, 9a, of the lever 9 moves to the right in FIG. 5.

In each of the embodiments described above, the ramp mechanism 5 preferably moves the head 4 from the position above the recording medium 2 to the head receded position, when the external vibration or shock is applied to the storage apparatus 1. In addition, the ramp retracting mechanism 6 preferably moves the ramp mechanism 5, carrying the head 4 receded to the head receded position thereof, from the position above the recording medium 2 to the ramp retracted position, when the external vibration or shock is applied to the storage apparatus 1.

In other words, when the strong external vibration or shock is applied to the storage apparatus 1 during operation (during the information read or the information write) of the storage apparatus 1, one of the recording medium 2 and the suspension arm 8 that supports the head 4 may bend, to cause the recording medium 2 and the head 4 to contact each other and damage one of the recording medium 2 and the head 4. In addition, if the recording medium 2 bends, the recording medium 2 and the ramp mechanism 5 may contact each other, and cause damage to at least one of the recording medium 2 and the ramp mechanism 5.

For this reason, if the vibration or shock is detected by an acceleration sensor, a drop sensor, or the like (not illustrated) provided in the storage apparatus 1, the procedures described above in conjunction with FIG. 2 and FIG. 3 may be performed before the vibration or shock becomes strong, to prevent damage to the head 4 and the recording medium 2, by moving the head 4 from the position above the recording medium 2 to the head receded position, and moving the ramp mechanism 5 from the position above the recording medium 2 to the ramp retracted position by the ramp retracting mechanism 6.

In each of the embodiments described above, the ramp mechanism 5 preferably moves the head 4 from the position above the recording medium 2 to the head receded position if a power supply to the storage apparatus 1 is cut off. Moreover, the ramp retracting mechanism 6 preferably moves the ramp mechanism 5, carrying the head 4 receded to the head receded position thereof, from the position above the recording medium 2 to the ramp retracted position if the power supply to the storage apparatus 1 is cut off.

The ramp mechanism 5 is preferably driven by a counter electromotive force generated by an inertial rotation of the motor 3, if the power supply to the storage apparatus 1 is cut off. In addition, the ramp retracting mechanism 6 is preferably driven by the counter electromotive force generated by the inertial rotation of the motor 3, if the power supply to the storage apparatus 1 is cut off.

The storage apparatus, such as the HDD, includes a function to forcibly move the head to the head receded position if the power supply is accidentally cut off and a spindle motor that rotates the disk-shaped recording medium and the motor that writes the head stop, in order to prevent the disk-shaped recording medium from being damaged by the head upon contact therewith. This function uses the counter electromotive force generated by the inertial rotation of the spindle motor.

In other words, if the power supply to the storage apparatus 1 is cut off and the recording medium 2 stops rotating, the vortex of air that causes the head 4 to float from the surface of the recording medium 2 is no longer generated, and the head 4 and the recording medium 2 make contact with each other, and both the head 4 and the recording medium 2 may become damaged. Furthermore, if the strong external vibration or shock is applied to the storage apparatus 1 in this state where the power supply to the storage apparatus 1 is cut off, the ramp mechanism 5 and the recording medium 2 make contact with each other, and both the ramp mechanism 5 and the recording medium 2 may become damaged.

For this reason, if the cutoff of the power supply is detected by a current sensor, a power sensor, or the like (not illustrated) provided in the storage apparatus 1, the procedures described above in conjunction with FIG. 2 and FIG. 3 may be performed, to prevent damage to the head 4 and the recording medium 2, by moving the head 4 from the position above the recording medium 2 to the head receded position, and moving the ramp mechanism 5 from the position above the recording medium 2 to the ramp retracted position by the ramp retracting mechanism 6.

Although the above described operation can be performed using an emergency battery provided in the storage apparatus 1, from a viewpoint of system convenience, it is preferable to perform the operation using the counter electromotive force generated by the inertial rotation of the motor 3.

Further, the various sensors described above may be found in conventional storage apparatuses, and the storage apparatus 1 may perform the above described above in response to detection signals received from such sensors.

Accordingly, each of the embodiments of the present invention can provide a storage apparatus having a high resistance with respect to strong external vibration or shock that may be applied thereto.

Although the embodiments are numbered with, for example, "first," "second," or "third," the ordinal numbers do not imply priorities of the embodiments.

Further, the present invention is not limited to these embodiments and exemplary implementations, but various variations, modifications, and substitutions may be made without departing from the scope of the present invention.

What is claimed is:

1. A storage apparatus comprising:
  a disk-shaped recording medium having a surface;
  a motor configured to drive and rotate the recording medium;
  a head configured to read information from and write information to the recording medium;
  a ramp mechanism configured to move the head from a position above the surface of the recording medium to a head receded position; and
  a ramp retracting mechanism configured to move the ramp mechanism from a position above the surface of the recording medium to a ramp retracted position,
  wherein each of the head receded position and the ramp retracted position is outside a range of the recording medium in a plan view viewed from above the recording medium in a direction perpendicular to the surface of the recording medium,
  wherein the motor drives the ramp mechanism by a counter electromotive force generated by an inertial rotation of the motor when a power supply to the storage apparatus is cut off.

2. The storage apparatus as claimed in claim 1, wherein the motor drives the ramp retracting mechanism by the counter electromotive force generated by the inertial rotation of the motor when the power supply to the storage apparatus is cut off.

3. A storage apparatus comprising:
  a disk-shaped recording medium having a surface;
  a motor configured to drive and rotate the recording medium;
  a head configured to read information from and write information to the recording medium;
  a ramp mechanism configured to move the head from a position above the surface of the recording medium to a head receded position; and
  a ramp retracting mechanism configured to move the ramp mechanism from a position above the surface of the recording medium to a ramp retracted position,
  wherein each of the head receded position and the ramp retracted position is outside a range of the recording medium in a plan view viewed from above the recording medium in a direction perpendicular to the surface of the recording medium,
  wherein the motor drives the ramp retracting mechanism by a counter electromotive force generated by an inertial rotation of the motor when a power supply to the storage apparatus is cut off.

4. The storage apparatus as claimed in claim 1, wherein the ramp mechanism includes a ramp, and
  a portion of the ramp mechanism overlaps the recording medium in the plan view while the ramp mechanism moves the head from the position above the surface of the recording medium to the head receded position via the ramp.

5. The storage apparatus as claimed in claim 3, wherein the ramp mechanism includes a ramp, and a portion of the ramp mechanism overlaps the recording medium in the plan view while the ramp mechanism moves the head from the position above the surface of the recording medium to the head receded position via the ramp.

6. The storage apparatus as claimed in claim 1, wherein the ramp retracting mechanism moves the ramp mechanism, carrying the head receded to the head receded position thereof, to the ramp retracted position.

7. The storage apparatus as claimed in claim 3, wherein the ramp retracting mechanism moves the ramp mechanism, carrying the head receded to the head receded position thereof, to the ramp retracted position.

\* \* \* \* \*